United States Patent
Yoshikawa et al.

(10) Patent No.: US 11,795,099 B2
(45) Date of Patent: Oct. 24, 2023

(54) FURNACE GAS FEEDING DEVICE, OPTICAL FIBER PRODUCTION DEVICE, AND OPTICAL FIBER PRODUCTION METHOD

(71) Applicant: SUMITOMO ELECTRIC INDUSTRIES, LTD., Osaka (JP)

(72) Inventors: Satoshi Yoshikawa, Osaka (JP); Katsuyuki Tsuneishi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 126 days.

(21) Appl. No.: 16/981,919

(22) PCT Filed: Mar. 22, 2019

(86) PCT No.: PCT/JP2019/012189
§ 371 (c)(1),
(2) Date: Sep. 17, 2020

(87) PCT Pub. No.: WO2019/182136
PCT Pub. Date: Sep. 26, 2019

(65) Prior Publication Data
US 2021/0094867 A1    Apr. 1, 2021

(30) Foreign Application Priority Data

Mar. 23, 2018    (JP) ................................ 2018-057227

(51) Int. Cl.
*C03B 37/029*    (2006.01)
(52) U.S. Cl.
CPC ........ *C03B 37/029* (2013.01); *C03B 2205/91* (2013.01)

(58) Field of Classification Search
CPC ............ C03B 2205/80; C03B 2205/81; C03B 2205/90–96
See application file for complete search history.

(56) References Cited

U.S. PATENT DOCUMENTS 4,101,300 A * 7/1978 Imoto ................... C03B 37/029
65/435
4,988,374 A    1/1991 Harding et al.
(Continued)

FOREIGN PATENT DOCUMENTS

CN    203212462 U    9/2013
JP    S52-119546 U    9/1977
(Continued)

OTHER PUBLICATIONS

JP-04310533-A EPO Machine Translation Performed Jan. 20, 2023. (Year: 2023).*

*Primary Examiner* — Lisa L Herring
(74) *Attorney, Agent, or Firm* — Faegre Drinker Biddle & Reath LLP (57) ABSTRACT

A furnace gas supply apparatus configured to supply gas into a drawing furnace, includes: a first flow channel introducing the gas from a predetermined first gas inlet to flow the gas from a predetermined first gas outlet toward a gas storage portion, and a second flow channel introducing the gas stored in the gas storage portion from a predetermined second gas inlet to flow the gas from a predetermined second gas outlet toward a furnace core tube of the drawing furnace, in which the gas storage portion is provided between the first gas outlet and the second gas inlet, and in which an opening position of the second gas inlet is provided at a position different from an opening position of the first gas outlet.

11 Claims, 5 Drawing Sheets

(56) References Cited

U.S. PATENT DOCUMENTS

| | | | |
|---|---|---|---|
| 2002/0100296 A1* | 8/2002 | Oh | ................... C03B 37/02718 |
| | | | 65/513 |
| 2004/0050112 A1 | 3/2004 | Bae et al. | |
| 2005/0115278 A1 | 6/2005 | Mattila | |
| 2017/0101336 A1 | 4/2017 | Carlton et al. | |

FOREIGN PATENT DOCUMENTS

| | | | | |
|---|---|---|---|---|
| JP | S62-260731 A | 11/1987 | | |
| JP | H01-192741 A | 8/1989 | | |
| JP | 04310533 A | * 11/1992 | ........... | C03B 37/029 |
| JP | 2590176 B2 | 3/1997 | | |
| JP | 2007-070189 A | 3/2007 | | |
| JP | 2012-056815 A | 3/2012 | | |
| KR | B1-100812468 | 3/2008 | | |

\* cited by examiner

FURNACE GAS FEEDING DEVICE, OPTICAL FIBER PRODUCTION DEVICE, AND OPTICAL FIBER PRODUCTION METHOD

TECHNICAL FIELD

The present disclosure relates to a furnace gas supply apparatus, an optical fiber manufacturing apparatus, and an optical fiber manufacturing method.

This application claims priority based on Japanese Patent Application No. 2018-057227 filed on Mar. 23, 2018, and incorporates all the contents described in the Japanese application therein.

BACKGROUND ART

Patent Literatures 1 to 3 disclose structures in which outside air is not trapped in a drawing furnace.

CITATION LIST

Patent Literature

Patent Literature 1: JP-A-2012-56815
Patent Literature 2: JP-A-2007-70189
Patent Literature 3: JP-A-S62-260731

SUMMARY OF INVENTION

A furnace gas supply apparatus according to one aspect of the present disclosure is configured to supply gas into a drawing furnace, and includes: a first flow channel introducing the gas from a predetermined first gas inlet to flow the gas from a predetermined first gas outlet toward a gas storage portion, and a second flow channel introducing the gas stored in the gas storage portion from a predetermined second gas inlet to flow the gas from a predetermined second gas outlet toward a furnace core tube of the drawing furnace, in which the gas storage portion is provided between the first gas outlet and the second gas inlet, and in which an opening position of the second gas inlet is provided at a position different from an opening position of the first gas outlet.

DESCRIPTION OF EMBODIMENTS

Problems to be Solved by Present Disclosure

An optical fiber is drawn from below a drawing furnace by inserting a optical fiber glass preform (hereinafter, referred to as glass preform) containing quartz as a main component into a furnace core tube of an optical fiber drawing furnace (hereinafter, referred to as drawing furnace) to heat and melt a tip of the glass preform to reduce the diameter. Since the temperature in the drawing furnace at this time is extremely high at approximately 2000° C., carbon having excellent heat resistance is used for a component in the drawing furnace.

In this case, gas is supplied into the drawing furnace to make the inside of the drawing furnace a positive pressure to prevent outside air (oxygen) from entering the drawing furnace. However, when the air-tightness is not excellently achieved (when the inside is not sealed) at a gap between the drawing furnace and the glass preform, the outside air is trapped in the drawing furnace to affect the life of the drawing furnace. Patent Literatures 1 to 3 disclose structures in which the outside air is not trapped in the drawing furnace.

Incidentally, it is desirable that the gas introduced into the drawing furnace is uniformly supplied into the drawing furnace evenly in the circumferential direction. When the gas is fed into the drawing furnace from a gas outlet having a constant area, the flow rate of gas is large in the vicinity of the center of the gas outlet and becomes smaller as moving away from the circumferential part, and thus, the flow rate unevenness occurs in the circumferential direction in the drawing furnace. In addition, when the gas is fed into the drawing furnace at a low temperature (without heating), the temperature difference between the temperature of a gas introducing portion and the temperature of the center of the drawing furnace that reaches the glass melting point, and thus, the temperature unevenness occurs in the drawing furnace. When the flow rate unevenness or the temperature unevenness occurs, gas convection easily occurs in the drawing furnace, and the variation in the outer diameter of the drawn optical fiber increases.

Here, the purpose of the present disclosure is to provide a furnace gas supply apparatus, an optical fiber manufacturing apparatus, and an optical fiber manufacturing method that are unlikely to cause the flow rate unevenness and the temperature unevenness of gas, and that enable reduce variation in the outer diameter of an optical fiber.

Effect of Present Disclosure

According to the present disclosure, it is possible to prevent flow rate unevenness or temperature unevenness from occurring in the drawing furnace, and to reduce variation in the outer diameter of the optical fiber.

DESCRIPTION OF EMBODIMENTS OF PRESENT DISCLOSURE

First, the contents of the embodiments of the present disclosure will be listed and described.

In a furnace gas supply apparatus according to one aspect of the present disclosure, (1) A furnace gas supply apparatus configured to supply gas into a drawing furnace, and includes: a first flow channel introducing the gas from a predetermined first gas inlet to flow the gas from a predetermined first gas outlet toward a gas storage portion, and a second flow channel introducing the gas stored in the gas storage portion from a predetermined second gas inlet to flow the gas from a predetermined second gas outlet toward a furnace core tube of the drawing furnace, in which the gas storage portion is provided between the first gas outlet and the second gas inlet, and in which an opening position of the second gas inlet is provided at a position different from an opening position of the first gas outlet. The second gas inlet of the second flow channel is provided at a position not opposing the first gas outlet of the first flow channel, the gas emitted from the first gas outlet collides with the periphery of the second gas inlet and the flow rate decreases, and thus, the flow rate unevenness of gas when entering the drawing furnace is unlikely to occur. Further, by providing the gas storage portion between the first gas outlet and the second gas inlet, it takes time for the gas emitted from the first gas outlet to enter the second gas inlet, the temperature increases by being heated by heat in the drawing furnace, and thus, the temperature unevenness of the gas in the drawing furnace is unlikely to occur.

(2) In the furnace gas supply apparatus according to the aspect of the present disclosure, the furnace gas supply apparatus further includes: an outer member having the first flow channel, and an inner member disposed inside the outer member and having the second flow channel.

When the outer member and the inner member are divided, the first flow channel or the second flow channel is easily formed, and further, the gas storage portion is easily provided.

(3) In the furnace gas supply apparatus according to the aspect of the present disclosure, the second gas outlet is formed by a plurality of slots or slits along a circumferential direction of the furnace core tube. When the second gas outlet is formed by a plurality of slots or slits, the flow rate of gas from the second flow channel can be reduced and the flow rate unevenness can be reduced compared to a case of being formed by round holes.

(4) In the furnace gas supply apparatus according to the aspect of the present disclosure, the second gas outlet is formed by one continuous slit along the entire circumference of the furnace core tube. When the second gas outlet is formed by a continuous slit, the flow rate of gas from the second flow channel can further be reduced, and the flow rate unevenness can further be reduced.

(5) An optical fiber manufacturing apparatus according to one aspect of the present disclosure includes: the above described furnace gas supply apparatus and a drawing furnace into which an optical fiberglass preform is inserted. It is possible to provide an optical fiber manufacturing apparatus in which the flow rate unevenness and the temperature unevenness are unlikely to occur and the variation in the outer diameter of the optical fiber is small.

(6) In an optical fiber manufacturing method according to one aspect of the present disclosure, an optical fiber manufacturing method by using the above described furnace gas supply apparatus, the method includes: inserting an optical fiber glass preform into the drawing furnace filled with the gas, and drawing an optical fiber by heating and melting the optical fiberglass preform in the drawing furnace. It is possible to provide an optical fiber manufacturing method in which the flow rate unevenness and the temperature unevenness are unlikely to occur and the variation in the outer diameter of the optical fiber is small.

DETAILS OF EMBODIMENTS OF PRESENT DISCLOSURE

Hereinafter, preferred embodiments of a furnace gas supply apparatus, an optical fiber manufacturing apparatus, and an optical fiber manufacturing method according to the present disclosure will be described with reference to the attached drawings. In addition, in the following, the description will be given by taking a resistance furnace in which a heater heats a furnace core tube as an example, but the present disclosure is also applicable to an induction furnace in which a high frequency power source is applied to a coil and the furnace core tube is induction-heated. In addition, a suspension mechanism of the glass preform, a configuration of the drawing furnace, and the like are also examples described below, and the present disclosure is not limited thereto.

Figure 1:
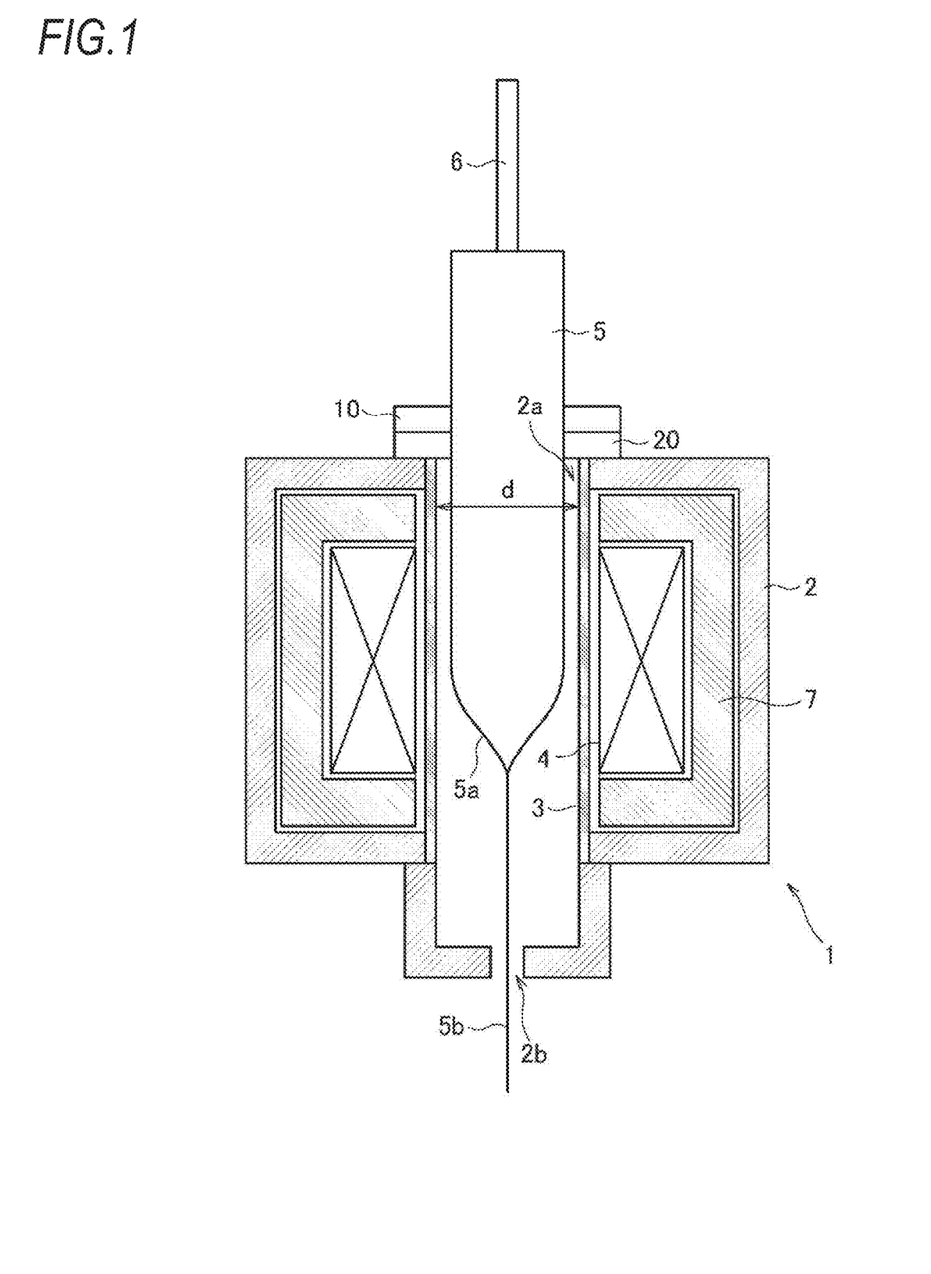
FIG. 1 is a view illustrating an outline of an optical fiber drawing furnace according to one embodiment of the present disclosure.

FIG. 1 is a view illustrating an outline of an optical fiber drawing furnace according to an embodiment of the present disclosure.

The drawing furnace 1 includes a furnace housing 2, a furnace core tube 3, a heating source (heater) 4, a seal structure 10, and a furnace gas supply apparatus 20. The furnace housing 2 has an upper end opening portion 2a and a lower end opening portion 2b, and is formed of, for example, stainless steel. The furnace core tube 3 is formed in a cylindrical shape at the center of the furnace housing 2 and communicates with the upper end opening portion 2a. The furnace core tube 3 is made of carbon, and a glass preform 5 is inserted into the furnace core tube 3 from the upper end opening portion 2a in a state of being sealed by the seal structure 10.

In the furnace housing 2, the heater 4 is disposed so as to surround the furnace core tube 3, and a heat insulating material 7 is accommodated so as to cover the outside of the heater 4. The heater 4 heats and melts the glass preform 5 inserted into the furnace core tube 3 and hangs down a melted and diameter-reduced optical fiber 5b from a lower end portion 5a. The glass preform 5 can be moved in the drawing direction (downward direction) by a separately provided moving mechanism, and a support rod 6 for suspending and supporting the glass preform 5 is connected to the upper side of the glass preform 5. Further, the furnace gas supply apparatus 20 is provided, for example, between the seal structure 10 and the upper end opening portion 2a, and is formed to be capable of supplying an inert gas (for example, gas containing argon or nitrogen) into the furnace core tube 3 for preventing oxidation and deterioration.

In addition, in FIG. 1, an example in which the upper end portion of the inner wall of the furnace core tube 3 directly forms the upper end opening portion 2a is given, but the present disclosure is not limited thereto. For example, an upper lid having an upper end opening portion narrower than an inner diameter d of the furnace core tube 3 may be provided on the upper side of the furnace core tube 3, and in this case, the gap to be sealed is a gap that occurs between the narrow upper end opening portion and the glass preform 5. In addition, the sectional shape of the glass preform 5 is basically generated so as to aim for a perfect circle, but regardless of accuracy, there may be some non-circles or oval shape or the like.

Example 1

Figure 2A:
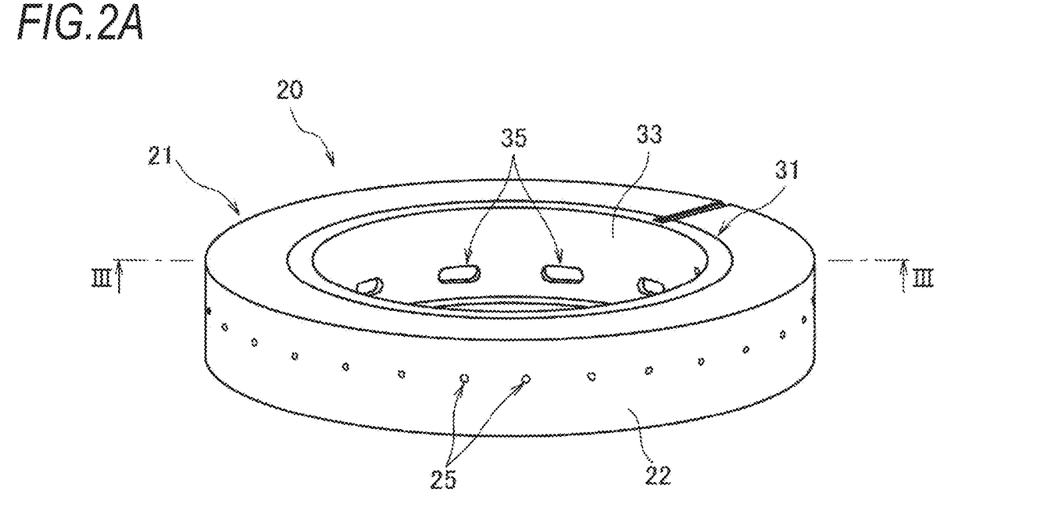
FIG. 2A is a perspective view of a furnace gas supply apparatus according to Example 1.
Figure 2B:
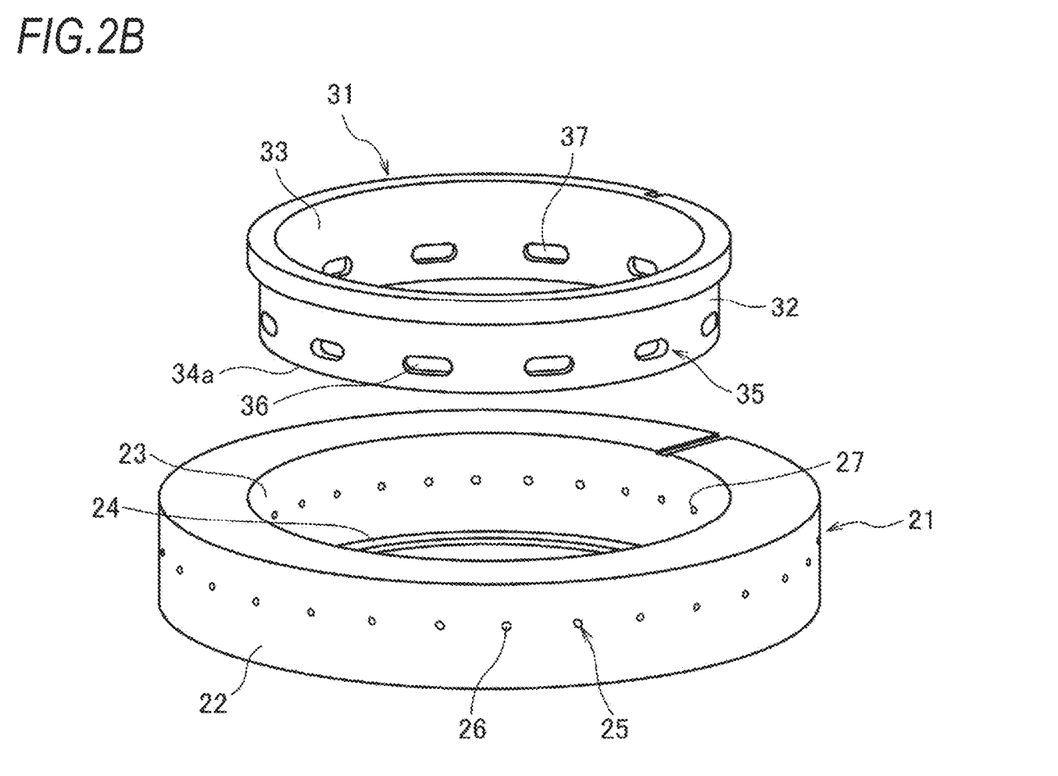
FIG. 2B is an exploded perspective view of FIG. 2A.
Figure 3A:
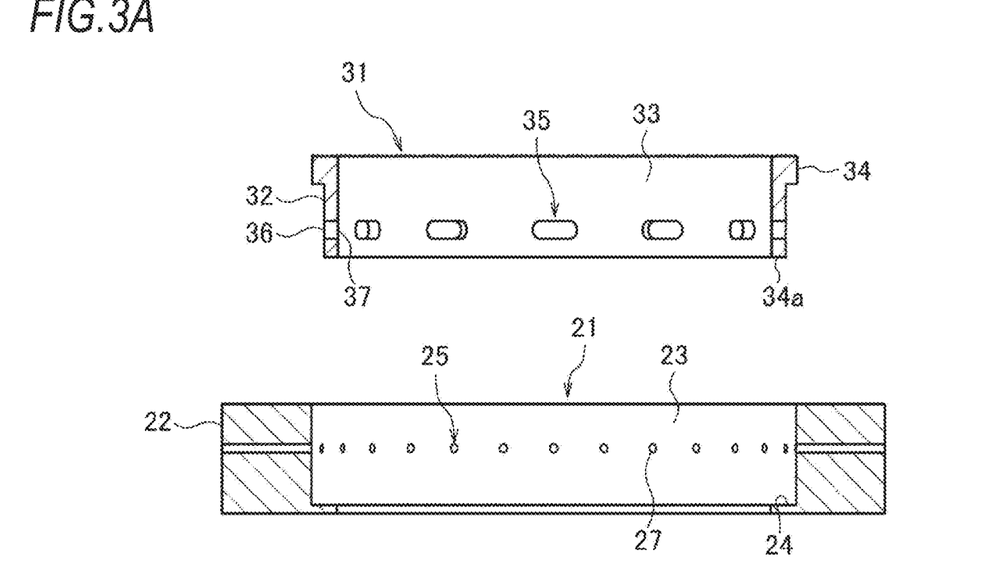
FIG. 3A is a sectional view of FIG. 2B.
Figure 3B:
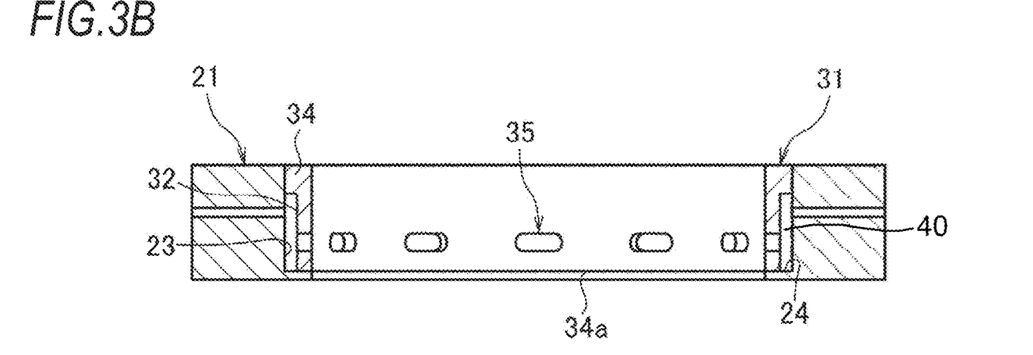
FIG. 3B is a sectional view taken along line HI-III of FIG. 2A.

FIG. 2A is a perspective view of the furnace gas supply apparatus according to Example 1, and FIG. 2B is an exploded perspective view of FIG. 2A. In addition, FIG. 3A is the sectional view of FIG. 2B, and FIG. 3B is a sectional view taken along line III-III of FIG. 2A.

As illustrated in FIG. 2A, the furnace gas supply apparatus 20 has an outer member 21 and an inner member 31 formed in a cylindrical shape. The inner member 31 is disposed inside the outer member 21 and is attachable to and detachable from the outer member 21.

The outer member 21 is formed of carbon, for example, and has an outer circumferential wall 22 and an inner circumferential wall 23 which are concentric to each other as illustrated in FIG. 2B. Further, as illustrated in FIG. 3A, for example, the lower end of the inner circumferential wall 23 extends inward in the radial direction of the outer member 21, and a pedestal portion 24 on which the inner member 31 can be placed is formed.

The outer member 21 has a first flow channel 25 therein. Specifically, the first flow channel 25 is formed to extend in the radial direction of the outer member 21 and penetrate the outer circumferential wall 22 and the inner circumferential wall 23.

The first flow channel 25 is formed by, for example, a round hole, and as illustrated in FIG. 2B, the first gas inlet 26 is open on the outer circumferential wall 22, and the first gas outlet 27 is open on the inner circumferential wall 23. In addition, the first gas inlet 26 corresponds to the first gas inlet of the first flow channel of the present disclosure, and the first gas outlet 27 corresponds to the first gas outlet of the first flow channel of the present disclosure. Further, for example, twenty to thirty first flow channels 25 are provided in the outer member 21, and are disposed at substantially equal intervals along the circumferential direction of the outer member 21.

In addition, the amount of gas supplied to the first flow channel 25 is preferably controlled by a controller (not illustrated).

The inner member 31 is formed of carbon, for example, and has an outer circumferential wall 32 and an inner circumferential wall 33 which are concentric to each other as illustrated in FIG. 2B. Further, as illustrated in FIG. 3A, for example, at the upper end of the inner circumferential wall 33, a flange portion 34 that extends outward in the radial direction of the inner member 31 is formed.

The inner member 31 has a second flow channel 35 therein. Specifically, the second flow channel 35 is formed so as to extend in the radial direction of the inner member 31 and penetrate the outer circumferential wall 32 and the inner circumferential wall 33.

The second flow channel 35 is formed by, for example, slots obtained by extending the round holes along the circumferential direction of the inner member 31, the second gas inlet 36 is open on the outer circumferential wall 32, and the second gas outlet 37 is open on the inner circumferential wall 33. In addition, the second gas inlet 36 corresponds to the second gas inlet of the second flow channel of the present disclosure, and the second gas outlet 37 corresponds to the second gas outlet of the second flow channel of the present disclosure. Further, for example, twelve second flow channels 35 are provided in the inner member 31, and are disposed at substantially equal intervals along the circumferential direction of the inner member 31. In addition, in FIGS. 2A, 2B, 3A, and 3B, an example in which the slots are formed from the second gas inlet 36 to the second gas outlet 37 has been described, but the second gas inlet 36 may be formed as a round hole and the second gas outlet 37 may be formed as a slot. In addition, as shown in FIGS. 2A, 2B, 3A, and 3B, a cross section area of the second flow channel 35 is larger than a cross sectional area of the first flow channel 25.

However, the second flow channel 35 is formed at a position not opposing the first flow channel 25. Specifically, the second flow channel 35 is formed below the first flow channel 25 in the height direction (the same direction as the height direction of the outer member 21 or the inner member 31: up-down direction in FIGS. 2A, 2B, 3A, and 3B) of the drawing furnace, and the second gas inlet 36 is disposed to oppose the inner circumferential wall 23 below the first gas outlet 27 without opposing the first gas outlet 27. In other words, the first gas outlet 27 is also disposed to oppose the outer circumferential wall 32 above the second gas inlet 36. In addition, a mark for aligning the flow channels may be provided on the upper surface of the inner member 31 or the upper surface of the outer member 21. Further, the second gas inlet 36 and the first gas outlet 27 may be displaced in the left-right direction instead of the up-down direction.

In addition, as illustrated in FIG. 3B, a buffer space 40 is provided between the outer member 21 and the inner member 31. Further, the buffer space 40 corresponds to the gas storage portion of the present disclosure.

Specifically, when the inner member 31 illustrated in FIG. 3A is lowered toward the outer member 21 and the lower end portion 34a of the inner member 31 is placed on the pedestal portion 24 of the outer member 21, as illustrated in FIG. 3B, the ring-shaped buffer space 40 is formed between the inner circumferential wall 23 of the outer member 21 and the outer circumferential wall 32 of the inner member 31, and between the flange portion 34 of the inner member 31 and the pedestal portion 24 of the outer member 21. In the buffer space 40, the gas before being emitted from the first gas outlet 27 described in FIG. 3A and entering the second gas inlet 36 can be stored.

In this manner, the second gas inlet 36 is provided at a position not opposing the first gas outlet 27, the gas emitted from the first gas outlet 27 collides with outer circumferential wall 32 of the inner member 31 and the flow rate decreases, and thus, the flow rate unevenness of gas in the circumferential direction when entering the drawing furnace is unlikely to occur, and the flow rate of the gas that enters the drawing furnace is equalized.

Further, by providing the buffer space 40 between the first gas outlet 27 and the second gas inlet 36, it takes time for the gas emitted from the first gas outlet 27 to enter the second gas inlet 36, the temperature increases by being heated by heat in the drawing furnace, and thus, the temperature unevenness of the gas is unlikely to occur, and the temperature of the gas in the drawing furnace is equalized.

In addition, when the outer member 21 and the inner member 31 are divided, the first flow channel 25 or the second flow channel 35 is easily formed, and further, the buffer space 40 is also easily provided.

Furthermore, when the gas outlet 37 of the second flow channel 35 is formed by a plurality of slots, the flow rate of gas from the second flow channel 35 can be reduced compared to a case of being formed by round holes.

Example 2

Figure 4:
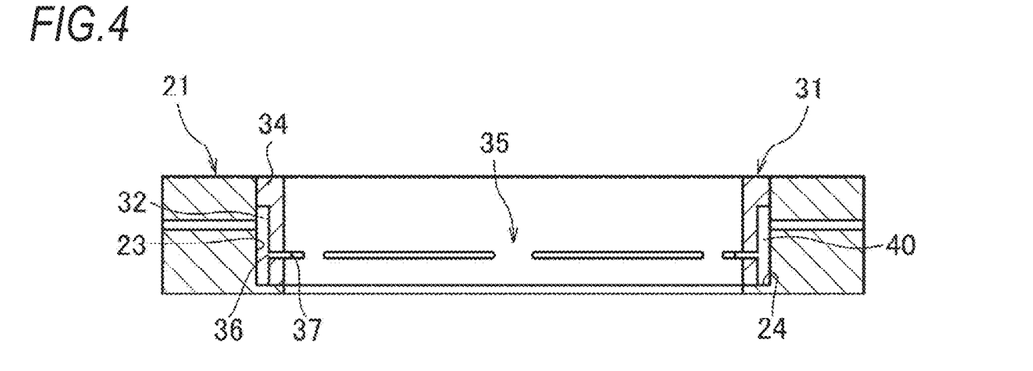
FIG. 4 is a sectional view of a furnace gas supply apparatus according to Example 2.

FIG. 4 is a sectional view of a furnace gas supply apparatus according to Example 2. Example 2 has the same configuration as that of Example 1 except for the shape of the second flow channel 35. Therefore, the second flow channel 35 will be described in detail, and the description of the outer member 21 and the like will be omitted.

As illustrated in FIG. 4, the second flow channel 35 is formed by, for example, slits obtained by extending the slots along the circumferential direction of the inner member 31, the gas inlet 36 is open on the outer circumferential wall 32, and the gas outlet 37 is open on the inner circumferential wall 33. Further, for example, six second flow channels 35 are provided in the inner member 31, and are disposed at substantially equal intervals along the circumferential direction of the inner member 31.

In a case of Example 2, the second flow channel 35 is formed at a position not opposing the first flow channel 25, and the second gas inlet 36 is disposed to oppose the inner circumferential wall 23 of the outer member 21 without opposing the first gas outlet 27.

Further, between the outer member 21 and the inner member 31, the buffer space 40 is provided, and the gas before entering the second gas inlet 36 can be stored.

Example 3

Figure 5A:
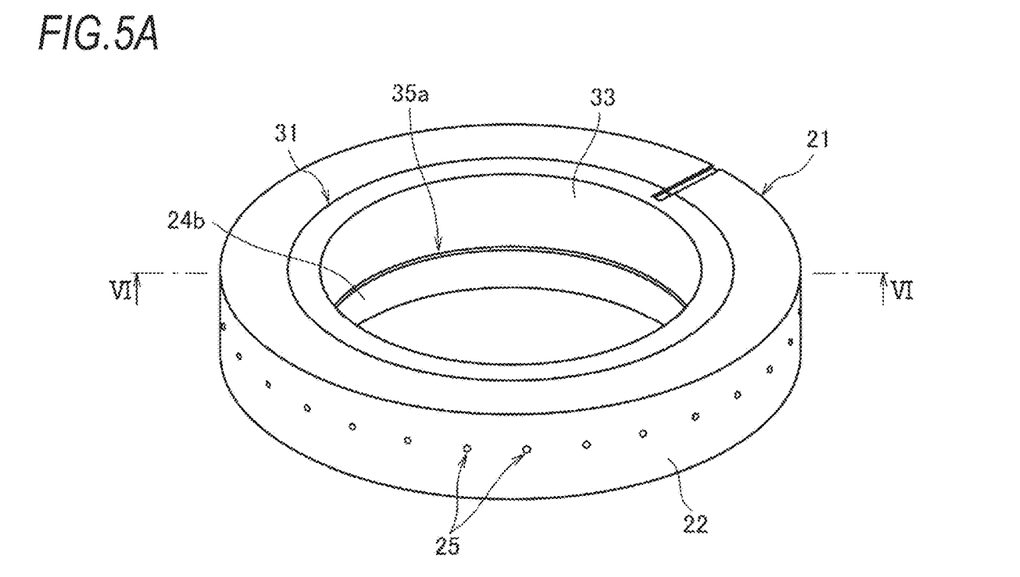
FIG. 5A is a perspective view of a furnace gas supply apparatus according to Example 3.
Figure 5B:
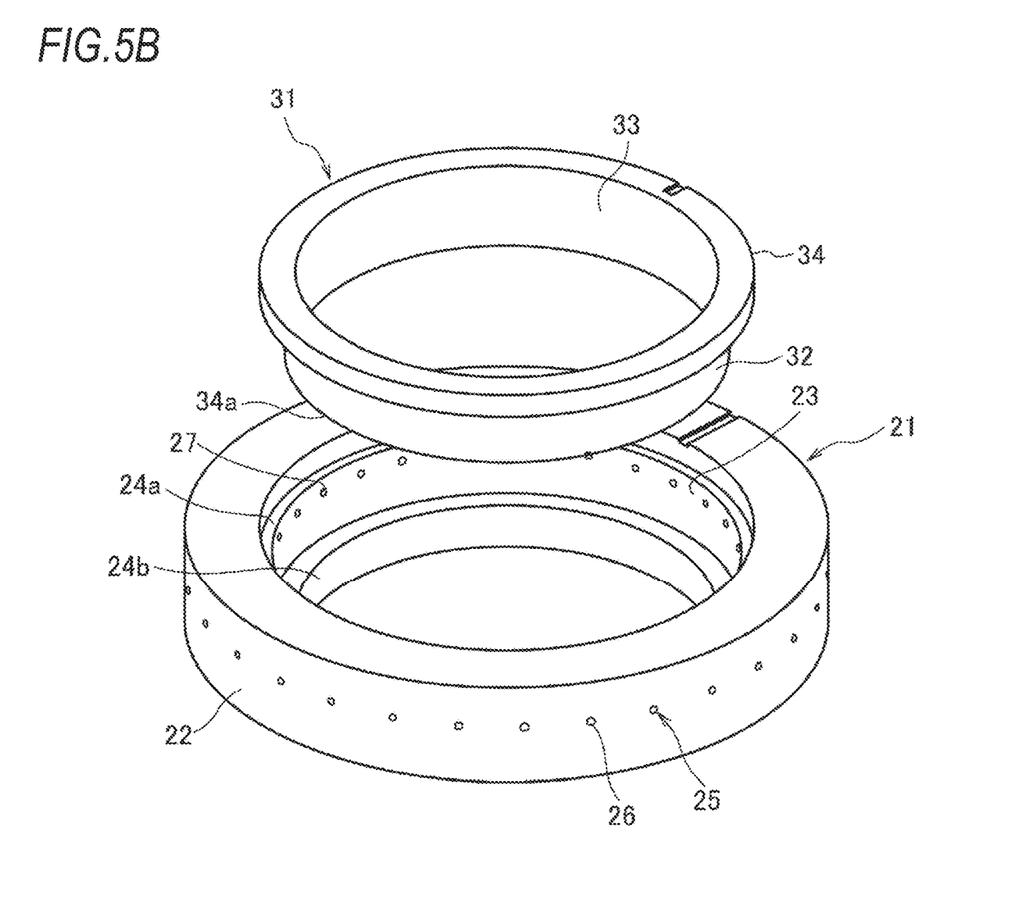
FIG. 5B is an exploded perspective view of FIG. 5A.
Figure 6:
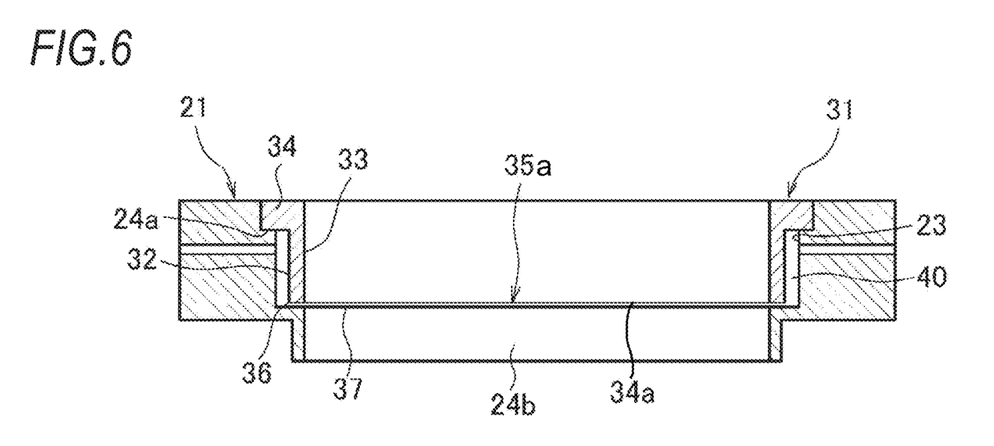
FIG. 6 is a sectional view taken along line VI-VI of FIG. 5A.

FIG. 5A is a perspective view of the furnace gas supply apparatus according to Example 3, and FIG. 5B is an exploded perspective view of FIG. 5A. In addition, FIG. 6 is a sectional view taken along line VI-VI of FIG. 5A.

In the outer member 21, as illustrated in FIG. 5B, for example, the upper end of the inner circumferential wall 23 is recessed outward in the radial direction of the outer member 21, and a grip portion 24a that can grip the flange portion 34 of the inner member 31 from below is formed. Further, the first flow channel 25 is the same as those in Examples 1 and 2.

In addition, at the lower end of the inner circumferential wall 23 of the outer member 21, a stepped portion 24b that extends inward in the radial direction of the outer member 21 is provided.

The inner member 31 has a second flow channel 35a at the lower end thereof. Specifically, as illustrated in FIG. 6, the second flow channel 35a is formed between the lower end portion 34a of the inner member 31 and the stepped portion 24b of the outer member 21.

Therefore, the second flow channel 35a is formed by slits obtained by extending slots along the circumferential direction of the inner member 31, and extends in the radial direction of the inner member 31, the second gas inlet 36 is open at the lower end of the outer circumferential wall 32, and the second gas outlet 37 is open to the lower end of the inner circumferential wall 33. Further, one second flow channel 35a is provided in the inner member 31, and is formed to continuous along the circumferential direction of the inner member 31.

In a case of Example 3, the second flow channel 35a is formed at a position not opposing the first flow channel 25, and the second gas inlet 36 of the second flow channel 35a is disposed to oppose the inner circumferential wall 23 below the first gas outlet 27 illustrated in FIG. 5B without opposing the first gas outlet 27 of the first flow channel 25.

Further, as illustrated in FIG. 6, between the outer member 21 and the inner member 31, the buffer space 40 is provided, and the gas before entering the second gas inlet 36 can be stored.

In addition, in Examples 1 to 3, an example in which the outer member 21 and the inner member 31 can be divided is given, but the present disclosure is not limited to this example, and the outer member and the inner member can also be integrally formed.

Further, the furnace gas supply apparatus 20 is not limited to the example of being installed between the seal structure 10 and the upper end opening portion 2a. For example, a case of being installed in the furnace core tube can also be applied.

The embodiments disclosed here are to be considered as illustrative in all points and not restrictive. The scope of the present disclosure is illustrated not by the meanings described above but by the claims, and is intended to include meanings equivalent to the claims and all modifications within the scope.

REFERENCE SIGNS LIST

1: optical fiber drawing furnace
2: furnace housing,
2a: upper end opening portion
2b: lower end opening portion
3: furnace core tube
4: heater
5: optical fiber glass preform
5a: lower end portion
5b: optical fiber
6: support rod
7: heat insulating material
10: seal structure
20: furnace gas supply apparatus
21: outer member
22: outer circumferential wall
23: inner circumferential wall
24: pedestal portion
24a: grip portion
24b: stepped portion
25: first flow channel
26: first gas inlet
27: first gas outlet
31: inner member
32: outer circumferential wall
33: inner circumferential wall
34: flange portion
34a: lower end portion
35, 35a: second flow channel
36: second gas inlet
37: second gas outlet
40: buffer space

The invention claimed is:

1. A furnace gas supply apparatus configured to supply gas into a drawing furnace, comprising:
   a first flow channel introducing gas from a predetermined first gas inlet and to flow the gas from a predetermined first gas outlet toward a gas storage portion; and
   a second flow channel introducing the gas stored in the gas storage portion from a predetermined second gas inlet to flow the gas from a predetermined second gas outlet toward a furnace core tube of the drawing furnace,
   wherein a cross sectional area of the second flow channel is larger than a cross sectional area of the first flow channel,
   wherein the gas storage portion is provided between the predetermined first gas outlet and the predetermined second gas inlet,
   wherein an opening position of the predetermined second gas inlet is provided at a position different from an opening position of the predetermined first gas outlet,
   wherein the first flow channel includes a plurality of first flow channels, the second flow channel includes a plurality of second flow channels, all of the first flow channels of the plurality of first flow channels have a predetermined first gas outlet, and all of the second flow channels of the plurality of second flow channels have a predetermined second gas inlet, and
   wherein the predetermined second gas inlet of all of the second flow channels of the plurality of second flow channels is provided at a position not opposing the predetermined first gas outlet of all of the first flow channels of the plurality of first flow channels.

2. The furnace gas supply apparatus according to claim 1, further comprising:
   an outer member having the first flow channel; and
   an inner member disposed inside the outer member and having the second flow channel.

3. The furnace gas supply apparatus according to claim 1, wherein the predetermined second gas outlet is formed by a plurality of slots or slits along a circumferential direction of the furnace core tube.

4. An optical fiber manufacturing apparatus comprising:
the furnace gas supply apparatus according to claim 1; and
a drawing furnace into which an optical fiber glass preform is inserted.

5. An optical fiber manufacturing method by using the furnace gas supply apparatus according to claim 4, the method comprising:
inserting an optical fiber glass preform into the drawing furnace filled with the gas; and
drawing an optical fiber by heating and melting the optical fiber glass preform in the drawing furnace.

6. A furnace gas supply apparatus configured to supply gas into a drawing furnace, comprising:
a first flow channel introducing gas from a predetermined first gas inlet and to flow the gas from a predetermined first gas outlet toward a gas storage portion; and
a second flow channel introducing the gas stored in the gas storage portion from a predetermined second gas inlet to flow the gas from a predetermined second gas outlet toward a furnace core tube of the drawing furnace, the gas storage portion is provided between the predetermined first gas outlet and the predetermined second gas inlet, and an opening position of the predetermined second gas inlet is provided at a position different from an opening position of the predetermined first gas outlet,
wherein the first flow channel includes a plurality of first flow channels, the second flow channel includes a plurality of second flow channels, and a number of the plurality of first flow channels is larger than a number of the plurality of second flow channels, all of the first flow channels of the plurality of first flow channels have a predetermined first gas inlet and a predetermined first gas outlet, and all of the second flow channels of the plurality of second flow channels have a predetermined second gas inlet and a predetermined second gas outlet, and
wherein the predetermined second gas inlet of all of the second flow channels of the plurality of second flow channels is provided at a position not opposing the predetermined first gas outlet of all of the first flow channels of the plurality of first flow channels.

7. The furnace gas supply apparatus according to claim 6, further comprising:
an outer member having all of the first flow channels of the plurality of first flow channels; and
an inner member disposed inside the outer member and having all of the second flow channels of the plurality of second flow channels.

8. The furnace gas supply apparatus according to claim 6, wherein the predetermined second gas outlet of all of the second flow channels of the plurality of second flow channels is formed by a plurality of slots or slits along a circumferential direction of the furnace core tube.

9. An optical fiber manufacturing apparatus comprising:
the furnace gas supply apparatus according to claim 6; and
a drawing furnace into which an optical fiber glass preform is inserted.

10. An optical fiber manufacturing method by using the furnace gas supply apparatus according to claim 9, the method comprising:
inserting an optical fiber glass preform into the drawing furnace filled with the gas; and
drawing an optical fiber by heating and melting the optical fiber glass preform in the drawing furnace.

11. The furnace gas supply apparatus according to claim 6, wherein all of the second flow channels of the plurality of second flow channels are formed below all of the first flow channels of the plurality of first flow channels in a height direction.

* * * * *